C. F. DAGGETT, Jr.
COUPLING.
APPLICATION FILED MAR. 8, 1920.

1,431,290.

Patented Oct. 10, 1922.

INVENTOR
Charles F. Daggett, Jr.
BY
ATTORNEYS

Patented Oct. 10, 1922.

1,431,290

UNITED STATES PATENT OFFICE.

CHARLES F. DAGGETT, JR., OF DETROIT, MICHIGAN.

COUPLING.

Application filed March 8, 1920. Serial No. 364,170.

*To all whom it may concern:*

Be it known that I, CHARLES F. DAGGETT, Jr., a citizen of the United States of America, residing at Detroit, in the county of Wayne and State of Michigan, have invented certain new and useful Improvements in Couplings, of which the following is a specification, reference being had therein to the accompanying drawings.

This invention relates to couplings and has special reference to that type of coupling commonly known as a "universal or ball joint," used for connecting operating parts of a steering column assembly so that a carbureter, timer or other device of an automobile or similar vehicle may be adjusted, and this type of coupling is exceedingly small compared to the universal joint of a drive shaft of an automobile, and must be more accurate in its construction and more sensitive in its operation, since the adjustments in connection with carbureters, timers, valves and other parts of automobiles are often very minute and consequently there can be no lost motion, back lash or loose connection in such operating mechanism.

My invention aims to provide a coupling which includes a socket member adapted to receive a ball member at one end thereof and an operating rod at the opposite end thereof. In the socket member is concealed a take-up wear member which may be adjusted and held in an adjusted position by a locking member, which is also concealed within the socket member. All of these elements are constructively arranged to permit of lubrication, and ease of transmitting power, and are as near dust proof as possible.

My invention further aims to accomplish the above results by a mechanical construction that will be hereinafter considered and then claimed, and reference will now be had to the drawings, wherein—

Figure 1:
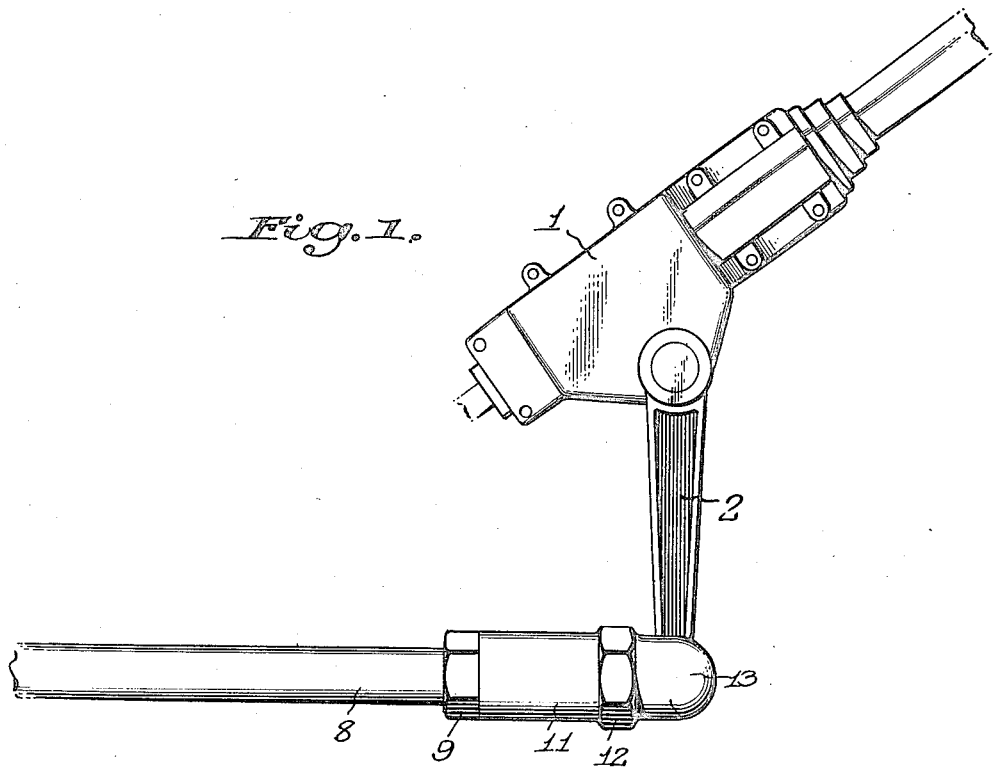
Figure 1 is a side elevation of the coupling associated with a portion of the steering column assembly.

In the drawing, the reference numeral 1 denotes, by the way of an example, the lower portion of the steering column assembly which includes an oscillatory crank operated from the upper end of the steering column assembly by a mechanism associated with the column, and this crank may represent the usual crank for operating a steering mechanism or adjusting a carbureter, timer or other device forming a part of an automobile or similar vehicle.

Attached to the lower end of the crank 2 is a screwthreaded shank 3 of a ball member 4 having a ball or spherical head 5. The ball member is positioned at a right angle to the crank 2 and is fixed relative thereto by a nut 6 of the shank 3 and a nut 7 screwed thereon, said nuts engaging opposite faces of the crank 2 so as to rigidly hold the ball member 4.

8 denotes an operating rod or member adapted to be connected to the ball member for transmitting power therefrom to a steering mechanism or to permit of adjustments being made in connection with other devices, as mentioned above. The operating rod or member 8 has a nut or head 9 and a shank portion 10 at that end thereof to be connected to the ball member 4.

11 denotes a tubular coupling or socket member having an intermediate nut portion 12 and a semi-spherical head 13 which is provided with a segment slot 14. The head 13 is adapted to receive the ball 5 of the ball member 4 which protrudes through the segment slot 14, said slot being of a width which permits of the ball member being inserted therethrough when the ball member is entered at the opposite end of the socket member 11. The slot 14 extends from a point at one side of the axis of the socket member 11 to that side wall of the socket member opposite such point, so that the socket member may swing in an arc of ninety degrees relative to the ball member. The width of the slot 14, however, precludes passage of the ball therethrough and with the ball in the spherical head 13 a connection is established between the socket and ball members so that the latter may be moved by the former.

Figure 2:
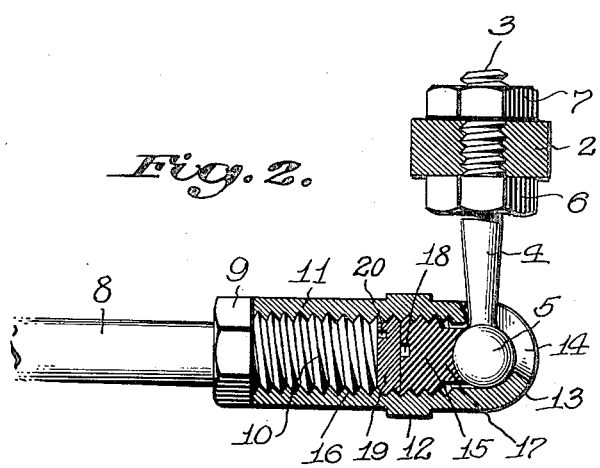
Fig. 2 is a longitudinal sectional view of the coupling.
Figure 3:
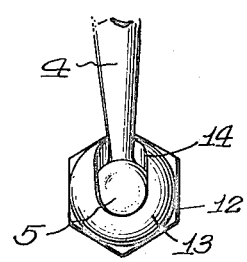
Fig. 3 is an end view of the same.

15 denotes a take-up wear member and the inner walls of the socket member are screwthreaded, as at 16, to receive said wear member, which has a reduced concave end 17 protruding into the head 13 and engaging the ball 5 to hold it against the inner wall of the head 13, as best shown in Fig. 2. The wear member 15 has a groove or recess 18 adapted to receive a suitable instrument, as a screw driver, so that it may be adjusted within the socket member.

19 denotes an exteriorly screwthreaded locking member mounted in the socket member against the take-up wear member, said locking member having a groove or recess 20 so that it may be adjusted in the socket member. Since the socket member is interiorly screwthreaded it may receive the shank portion 10 of the operating rod 8 and thus establish a connection between said rod and the ball member.

During an oscillatory movement of the crank 2 the operating rod 8 and the socket member 11 may assume an angle relative to the ball member and during such angular adjustment have movement transmitted from the steering column assembly to the operating rod. During such movement there is no chance of back lash on the part of the ball 5 since the take-up wear member may be adjusted to hold the ball member frictionally against the inner wall of the head 13, and should there be wear tending to make a loose connection, it is an extremely easy matter to disconnect the operating rod 8 and the socket member 11 and adjust the members 15 and 19 therein. I attach considerable importance to the fact that these members are concealed within the socket member and that the coupling establishes a clean cut connection between the crank 2 and the connecting rod 8 without interfering with any other adjustable members about the lower end of the steering rod assembly.

What I claim is:

1. In a coupling device, wherein an operating rod is connected by such device to a crank forming part of a steering column;— a shank connected to the crank part and having a ball at its end in the axis of said shank, and a socket member through which the shank is inserted to have its ball engage in the socket end of said socket member, said socket member having a socket configuration which permits of an angular movement of over ninety degrees of said socket member relative to said ball member in one direction only.

2. In a steering gear coupling device, a socket member having a semi-spherical hollow head with a wall thereof provided with a slot extending from one side of the axis of said head to the other side of the axis of said head and having an arc of over ninety degrees, a shank insertable lengthwise through said head and through the slot thereof with a ball on its end to engage in the hollow head and permit said shank to swing in the head slot, and means retaining the shank ball in the head of said socket member.

In testimony whereof I affix my signature in the presence of two witnesses.

CHARLES F. DAGGETT, Jr.

Witnesses:
ANNA M. DORR,
CHAS. W. STAUFFIGER.